United States Patent
Kenney et al.

(10) Patent No.: US 12,331,162 B2
(45) Date of Patent: Jun. 17, 2025

(54) POLYMERISATION OF SILOXANE POLYMERS

(71) Applicant: DOW SILICONES CORPORATION, Midland, MI (US)

(72) Inventors: James Andrew Kenney, Midland, MI (US); Timothy J. Gallagher, Midland, MI (US); Phillip Griffith, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/863,396

(22) PCT Filed: May 2, 2023

(86) PCT No.: PCT/US2023/020676
§ 371 (c)(1),
(2) Date: Nov. 6, 2024

(87) PCT Pub. No.: WO2023/219834
PCT Pub. Date: Nov. 16, 2023

(65) Prior Publication Data
US 2025/0109254 A1    Apr. 3, 2025

Related U.S. Application Data (60) Provisional application No. 63/339,573, filed on May 9, 2022.

(51) Int. Cl.
*C08G 77/06* (2006.01)
*B29B 7/00* (2006.01)
(Continued)

(52) U.S. Cl.
CPC .............. *C08G 77/06* (2013.01); *B29B 7/007* (2013.01); *B29B 7/48* (2013.01); *B29B 7/582* (2013.01);
(Continued)

(58) Field of Classification Search
USPC ........................................................ 528/37
See application file for complete search history.

(56) References Cited

U.S. PATENT DOCUMENTS 3,433,765 A    3/1969   Lothar
3,997,496 A   12/1976   Razzano
(Continued)

FOREIGN PATENT DOCUMENTS

EP    0893480 A1    1/1999
JP    H0633338 B2   5/1994
(Continued)

OTHER PUBLICATIONS

International Search Report for PCT/US2023/020676 dated Aug. 3, 2023, 3 pages.

*Primary Examiner* — Marc S Zimmer
(74) *Attorney, Agent, or Firm* — Warner Norcross + Judd LLP (57) ABSTRACT

An improved process for the preparation of high viscosity (i.e., greater than 1 million mPa·s at 25° C.) silanol-terminated silicone polymers and copolymers, often referred to in the industry as silanol-terminated silicone polymer gums. The silanol-terminated silicone polymer gums are made by the ring-opening polymerisation of organocyclosiloxane oligomers (alternatively referred to as cyclic siloxane oligomers) using a conical screw dump extruder (1). It also relates to silanol-terminated silicone polymer gums made by the process.

11 Claims, 1 Drawing Sheet

(51) Int. Cl.
    *B29B 7/48*          (2006.01)
    *B29B 7/58*          (2006.01)
    *C08G 77/08*        (2006.01)
    *C08G 77/16*        (2006.01)
    *B29K 83/00*        (2006.01)

(52) U.S. Cl.
    CPC ............. *C08G 77/08* (2013.01); *C08G 77/16* (2013.01); *B29K 2083/00* (2013.01)

(56) References Cited

U.S. PATENT DOCUMENTS

| | | | |
|---|---|---|---|
| 4,250,290 | A | 2/1981 | Petersen |
| 4,317,899 | A | 3/1982 | Bluestein et al. |
| 4,551,515 | A | 11/1985 | Herberg et al. |
| 5,302,632 | A | 4/1994 | Maxson |
| 5,475,077 | A | 12/1995 | Sato et al. |
| 6,214,962 | B1 * | 4/2001 | Takahashi .............. C08G 77/32 528/21 |
| 6,433,204 | B1 | 8/2002 | Gosh et al. |
| 7,556,419 | B2 | 7/2009 | Colombo |
| 7,671,161 | B2 | 3/2010 | Gosh et al. |
| 9,700,860 | B2 | 7/2017 | Urakami et al. |
| 2006/0247406 | A1 | 11/2006 | Reitmeier et al. |
| 2021/0113975 | A1 | 4/2021 | Colombo |
| 2022/0049097 | A1 | 2/2022 | Drake et al. |

FOREIGN PATENT DOCUMENTS

| | | |
|---|---|---|
| WO | 2017093854 A1 | 6/2017 |
| WO | 2021195037 A1 | 9/2021 |

* cited by examiner

POLYMERISATION OF SILOXANE POLYMERS

CROSS-REFERENCE TO RELATED APPLICATIONS

This application is the U.S. national stage of PCT/US2023/020676 filed on 2 May 2023, which claims priority to U.S. Provisional Patent Application No. 63/339,573 filed on 9 May 2022, the content of which is incorporated herein by reference.

This relates to an improved process for the preparation of high viscosity (i.e., greater than 1 million mPa·s at 25° C.) silanol-terminated silicone polymers and copolymers, often referred to in the industry as silanol-terminated silicone polymer gums. The silanol-terminated silicone polymer gums are made by the ring-opening polymerisation of organocyclosiloxane oligomers (alternatively referred to as cyclic siloxane oligomers). It also relates to silanol-terminated silicone polymer gums made by the process.

Organocyclosiloxane oligomers are formed by the hydrolysis of diorganodichlorosilanes and can be isolated by distillation. They are critical intermediates in the silicone industry as they may be used as the main building blocks in the preparation of silicone polymers and copolymers and their respective gums.

Each siloxane unit in an organocyclosiloxane is typically of the structure

—[(R'$_2$)SiO]—

With each R' group being the same or different and being selected from an alkyl group, an alkenyl group, an aryl group, a fluoroalkyl such as trifluoropropyl or a perfluoroalkyl group. Hence said organocyclosiloxane oligomers may, for example, comprise dimethylsiloxane units, methylvinylsiloxane units, trifluoroalkylmethylsiloxane units, e.g., trifluoropropylmethylsiloxane units and/or phenylmethylsiloxane units in the ring.

The organocyclosiloxane oligomers preferred for use as polymer building blocks typically have an average of from 3 to 5 siloxane units in an organocyclosiloxane ring. Examples of suitable organocyclosiloxane oligomers are octamethylcyclotetrasiloxane, hexamethylcyclotrisiloxane, decamethylcyclopentasiloxane, cyclopenta(methylvinyl)siloxane, cyclotetra(phenylmethyl)siloxane, cyclopentamethylhydrosiloxane, trifluoropropymlethylcyclotrisiloxane and mixtures thereof.

Typically, the organocyclosiloxane oligomers and mixtures thereof, either alone or together with suitably end-blocked polydiorganosiloxanes, undergo a polymerisation process involving the ring opening of the organocyclosiloxane oligomers in the presence of a catalyst such as an acid or base. An equilibrium between the desired high-molecular compounds and a mixture of organocyclosiloxane compounds is created in the course of the polymerisation reaction. The resulting equilibrium largely depends on the nature and number of organocyclosiloxane compound(s), the catalyst used and the polymerisation process temperature. Such polymerisation processes are generally carried out in the absence of a solvent. Typically end-blocking agents are used to add functionality and regulate the molecular weight of the resulting polymers.

For example, silicone polymers and copolymers comprising fluoroalkyl groups such as trifluoropropyl groups or perfluoroalkyl groups may be, for the sake of example, either:—

$$R^1(R^2)_2SiO\text{---}((R^4)(R^3)SiO)_m\text{---}Si(R^1)(R^2) \quad (I)$$

$$R^1(R^2)_2SiO\text{---}((R^4)(R^3)SiO)_m\text{---}((R^2)_2SiO)_qSi(R^1)(R^2)_2 \quad (II)$$

in which
each $R^2$ is the same or different and is a saturated monovalent hydrocarbon group such as an alkyl group, an aryl group or an alkaryl group, a fluoroalkyl group or a perfluoroalkyl group;
each $R^1$ is —OH, hydrogen an alkenyl group or an alkynyl group;
each $R^3$ is a fluoroalkyl group or perfluoroalkyl group;
each $R^4$ is $R^2$ or an unsaturated monovalent hydrocarbon group such as an alkenyl group or an alkynyl group; and
q and m are positive integers. Copolymers may be random or block copolymers.

Such silicone polymers and/or silicone copolymers are often prepared via a ring-opening polymerisation process starting from organocyclosiloxanes including fluoro-substituted organocyclosiloxanes such as a tri-(fluoropropylmethyl) tricyclosiloxane: $((CH_3)(CH_2CH_2CF_3)SiO)_3$ and a suitable catalyst such as an alkali metal hydroxide, an alkali metal alkoxide or complexes of alkali metal hydroxides and an alcohol; silanolates such as alkali metal silanolates, phosphonitrile halides (sometimes referred to as acidic phosphazenes) phosphazene bases and the catalyst derived by the reaction of a tetra-alkyl ammonium hydroxide and a siloxane tetramer as described in U.S. Pat. No. 3,433,765. The viscosity of the resulting polymers may be controlled/limited using a suitable chain initiator/endblocker such as water or suitable short chain siloxanes such as short chain silanols. After the polymerisation reaction has completed, the catalyst is quenched in a suitable manner and the remaining low-molecular constituents may be stripped off if desired.

Batch processes for making silicone polymer gums utilising the above ring-opening polymerisation processes often use a Kneader-style mixer for the preparation of the silicone polymer gums and then transfers/dumps the resulting polymer into a second piece of equipment such as a pan or large hopper extruder for down-packaging. However, transferring polymer materials between equipment may result in contamination and reliability issues which has resulted in the need for e.g., polytetrafluoroethylene (PTFE) packing and laborious cleaning steps because of the need for dumping and scraping residual materials between batches due to changeover loss. Furthermore, the need to transfer polymers between separate equipment provides the possibility of operators being exposed to potentially toxic materials.

There is provided herein a silanol-terminated silicone polymer gum production process wherein the silanol-terminated silicone polymer gum has a William's plasticity of at least 200 mm/100 in accordance with ASTM D-926-08; comprising: undertaking a ring opening polymerization of one or more organocyclosiloxane oligomer(s) having from 3 to 5 siloxane units per molecule, which siloxane units comprise dialkylsiloxane units, alkylalkenylsiloxane units, trifluoroalkyl alkylsiloxane units, perfluoroalkyl alkyl siloxane units, phenylalkyl alkylsiloxane units or mixtures thereof in the organocyclosiloxane ring, wherein each alkyl group is the same or different and contains from 1 to 10 carbons, each alkenyl group is the same or different and has from 2 to 10 carbons; by
(i) transporting the one or more organocyclosiloxane oligomer(s) having from 3 to 5 siloxane units per molecule to a polymerisation reactor, which polymerisation reactor is heated to a pre-defined temperature of from 40 to 170° C. in an inert atmosphere, (ii) simultaneously with or subsequent to step (i), introducing a suitable —OH species containing chain initiator/endblocker into the polymerisation reactor and mixing same with the organocyclosiloxane oligomer(s) while residual water is removed, if required, (iii) introducing a catalyst, suitable for catalysing the ring opening polymerization, into the polymerisation reactor to form a reaction mixture with the resulting mixture of step (ii) and subsequently proceeding with ring opening polymerisation of the one or more organocyclosiloxane oligomer(s) to generate a silicone polymer gum reaction product;

(iv) quenching the silicone polymer gum reaction product resulting from step (iii) and optionally vacuum stripping the silicone polymer gum reaction product with a vacuum means in said polymerisation reactor;

(v) Cooling the silicone polymer gum reaction product resulting from step (iv) to form a final silicone polymer gum reaction product and then undertaking either one of steps (vi) or (vii) or both steps (vi) and (vii);

(vi) Transporting final silicone polymer gum reaction product to a packaging means for packaging in a suitable storage container;

(vii) Transporting final silicone polymer gum reaction product to a compounding means for combining said silicone polymer gum reaction product with other ingredients;

characterised in that the polymerisation reactor utilised is a conical screw dump extruder comprising a conical twin screw chamber, said conical twin screw chamber housing two counter-rotating conical screws converging towards an extrusion die having an entrance and an exit wherein passage through said extrusion die is controlled by an occlusion means such that the exit of said extrusion die is adapted to be closed by the occlusion means up to the end of step (v) and be open during steps (vi), (vii) or both (vi) and (vii) such that during polymerisation the reaction mixture is driven towards extrusion die by the pair of counter-rotating conical screws, and then forced to go back when the extrusion die is closed by the occlusion means and then during step (vi), (vii) or both steps (vi) and (vii) is extruded through said extrusion die and transported to the packaging means and/or compounding means respectively.

There is also provided a silanol-terminated silicone polymer gum having a William's plasticity of at least 200 mm/100 in accordance with ASTM D-926-08 obtained or obtainable by the above process.

There is also provided the use of a conical screw dump extruder as a polymerisation reactor in a silanol-terminated silicone polymer gum production process wherein the silanol-terminated silicone polymer gum has a William's plasticity of at least 200 mm/100 in accordance with ASTM D-926-08; comprising: undertaking a ring opening polymerization of one or more organocyclosiloxane oligomer(s) having from 3 to 5 siloxane units per molecule, which siloxane units comprise dialkylsiloxane units, alkylalkenylsiloxane units, trifluoroalkyl alkylsiloxane units, perfluoroalkyl alkyl siloxane units, phenylalkyl alkylsiloxane units or mixtures thereof in the organocyclosiloxane ring, wherein each alkyl group is the same or different and contains from 1 to 10 carbons, each alkenyl group is the same or different and has from 2 to 10 carbons; by (i) transporting the one or more organocyclosiloxane oligomer(s) having from 3 to 5 siloxane units per molecule to a polymerisation reactor, which polymerisation reactor is heated to a pre-defined temperature of from 40 to 170° C. in an inert atmosphere;

(ii) simultaneously with or subsequent to step (i), introducing a suitable —OH species containing chain initiator/endblocker into the polymerisation reactor and mixing same with the organocyclosiloxane oligomer (s) while residual water is removed, if required;

(iii) introducing a catalyst, suitable for catalysing the ring opening polymerization, into the polymerisation reactor to form a reaction mixture with the resulting mixture of step (ii) and subsequently proceeding with ring opening polymerisation of the one or more organocyclosiloxane oligomer(s) to generate a silicone polymer gum reaction product;

(iv) quenching the silicone polymer gum reaction product resulting from step (iii) and optionally vacuum stripping the silicone polymer gum reaction product with a vacuum means in said polymerisation reactor;

(v) Cooling the silicone polymer gum reaction product resulting from step (iv) to form a final silicone polymer gum reaction product; and then undertaking either one of steps (vi) or (vii) or both steps (vi) and (vii);

(vi) Transporting final silicone polymer gum reaction product to a packaging means for packaging in a suitable storage container;

(vii) Transporting final silicone polymer gum reaction product to a compounding means for combining said silicone polymer gum reaction product with other ingredients;

characterised in that the polymerisation reactor utilised is a conical screw dump extruder comprising a conical twin screw chamber, said conical twin screw chamber housing two counter-rotating conical screws converging towards an extrusion die having an entrance and an exit wherein passage through said extrusion die is controlled by an occlusion means such that the exit of said extrusion die is adapted to be closed by the occlusion means up to the end of step (v) and be open during steps (vi), (vii) or both (vi) and (vii) such that during polymerisation the reaction mixture is driven towards extrusion die by the pair of counter-rotating conical screws, and then forced to go back when the extrusion die is closed by the occlusion means and then during steps (vi), (vii) or both (vi) and (vii) is extruded through said extrusion die and transported to the packaging means and/or compounding means respectively.

It will be appreciated that this disclosure relates to a polymerisation process starting with low viscosity organocyclosiloxane oligomers and not compounding a number of ingredients to make a silicone base composition or a curable composition. The conical screw dump extruders are designed to inter-mix pre-formed polymers and fillers into a base material or compound with other ingredients not for polymerisation using low viscosity organocyclosiloxane oligomers as the initial ingredients. The one or more organocyclosiloxane oligomer(s) has from 3 to 5 siloxane units per molecule comprising dialkylsiloxane units, alkylalkenylsiloxane units, trifluoroalkyl alkylsiloxane units, perfluoroalkyl alkyl siloxane units, phenylalkyl alkylsiloxane units or mixtures thereof in the organocyclosiloxane ring, wherein each alkyl group is the same or different and contains from 1 to 10 carbons, alternatively is the same or different and contains from 2 to 10 carbons. Any suitable organocyclosiloxane oligomer having from 3 to 5 siloxane units per molecule or combination of said organocyclosiloxane oligomers may be used for the process herein. Each siloxane unit in an organocyclosiloxane oligomer is typically of the structure —[(R'$_2$)SiO]—

With each R' group being the same or different and being selected from an alkyl group, an alkenyl group, an aryl group, a fluoroalkyl group such as trifluoropropyl or a perfluoroalkyl groups.

Examples of suitable organocyclosiloxane oligomers include but are not restricted to octamethylcyclotetrasiloxane, hexamethylcyclotrisiloxane, decamethylcyclopentasiloxane, penta-(methylvinyl)cyclopentasiloxane, tetra-(phenylmethyl) cyclotetrasiloxane, penta-(methylhydro)cyclopentasiloxane, tri-(methylvinyl)cyclotrisiloxane, tri-(ethylvinyl)cyclotrisiloxane, tetra-(methylvinyl)cyclotetrasiloxane, tetra-(ethylvinyl)cyclotetrasiloxane, penta-(methylvinyl)cyclopentasiloxane and penta-(ethylvinyl)cyclopentasiloxane.

The organocyclosiloxane oligomers utilised for this process may include fluoro containing groups including fluoroalkyl groups such as trifluoropropyl, trifluoroethyl, and nonafluorohexyl groups and perfluoroalkyl groups such as, for example, $CF_3-$, $C_2F_5-$, $C_3F_7-$, such as $CF_3CF_2CF_2-$ or $(CF_3)_2CF-$, $C_4F_9-$, such as $CF_3CF_2CF_2CF_2-$, $(CF_3)_2CFCF_2-$, $(CF_3)_3C-$ and $CF_3CF_2(CF_3)CF-$; $C_5F_{11}$ such as $CF_3CF_2CF_2CF_2CF_2-$, $C_6F_{13}-$, such as $CF_3(CF_2)_4CF_2-$; $C_7F_{14}-$, such as $CF_3(CF_2CF_2)_3-$; and $C_8F_{17}-$.

Specific examples include tri-(fluoropropylmethyl) tricyclosiloxane, tri-(fluoropropylethyl) tricyclosiloxane, tetra-(fluoropropylmethyl) tetracyclosiloxane, tetra-(fluoropropylethyl) tetracyclosiloxane, penta-(fluoropropylmethyl) pentacyclosiloxane, penta-(fluoropropylethyl) pentacyclosiloxane, tri-(fluoroethylmethyl) tricyclosiloxane, tri-(fluoroethylethyl) tricyclosiloxane, tetra-(fluoroethylmethyl) tetracyclosiloxane, tetra-(fluoroethylethyl) tetracyclosiloxane, penta-(fluoroethylmethyl) pentacyclosiloxane, penta-(fluoroethylethyl) pentacyclosiloxane and mixtures thereof.

Any suitable —OH species containing chain initiator/endblocker may be utilised to initiate polymerisation and/or end/block the resulting silicone polymer gum.

The —OH species may be water, an alcohol, a glycol. Specific examples include linear or branched aliphatic alcohols having from 2 to 10 carbons per molecule, including ethanol, propanol, butanol, pentanol, hexanol, heptanol, octanol, isopropanol, isobutanol, 2-methyl-1-butanol, and 3-methyl-1-butanol, propylene glycol, ethylene glycol and/or butylene glycol. The —OH species may alternatively be a short chain organopolysiloxane having at least one —OH group per molecule e.g., a disilanol or trisilanol and a degree of polymerisation of from 2 to 30 comprising any suitable siloxane units, for example (Me$_2$Si—O) units, (ViMeSi—O) units, (MePhSi—O) units, (Ph$_2$Si—O) units and (MeTFPSi-O) (where TFP stands for trifluoropropyl) or a mixture thereof. The short chain organopolysiloxane having at least one —OH group per molecule has an average degree of polymerisation of from 2 to 30 per molecule, alternatively an average degree of polymerisation of from 3 to 25 comprising an average degree of polymerisation of from 5 to 25. As a specific example the —OH species containing chain initiator/endblocker may be HO(MeTFPSi-O)$_d$—H Where the average value of d is an average degree of polymerisation of from 2 to 30 per molecule, alternatively an average degree of polymerisation of from 2 to 25, alternatively comprising an average degree of polymerisation of from 2 to 20, alternatively comprising an average degree of polymerisation of from 2 to 15, alternatively comprising an average degree of polymerisation of from 2 to 10, wherein Me stands for methyl and TFP stands for trifluoropropyl.

The catalyst used herein may be any catalyst suitable for catalysing the ring opening polymerization, reaction for example:
(I) suitable alkali catalysts, e.g., a suitable hydroxide such as potassium hydroxide caesium hydroxide or ammonium hydroxide or silanolates;
(II) suitable alkyl alkali metals such as n-butyl lithium, n-butyl sodium and n-butyl potassium;
(III) ammonia;
(IV) alkali metal alkoxides or complexes of alkali metal hydroxides and an alcohol;
(V) the catalyst derived by the reaction of a tetra-alkyl ammonium hydroxide and a siloxane tetramer as described in U.S. Pat. No. 3,433,765;
(VI) Alkali metal containing silanolates for example potassium silanolates, such as potassium trimethylsilanolate (($CH_3)_3$—Si—O$^-$ K$^+$), lithium silanolates and sodium silanolates such as sodium trifluoropropylmethyl silanolate which has the following structure:

where the initial average value of n is between 3 and 6 when added into the starting organocyclosiloxane oligomer(s); (VII) Non-metallic silanolates such as silanolates of the alkylammonium hydroxide compounds, for example, tetramethylammonium trimethylsilanolate [(CH$_3$)$_4$N—OSi(CH$_3$)$_3$], tetraethylammonium trimethylsilanolate, tetrapropylammonium trimethylsilanolate, tetramethylammonium triethylsilanolate, tetraethylammonium triethylsilanolate, tetrapropylammonium triethylsilanolate, tetramethylammonium tripropylsilanolate, tetraethylammonium tripropylsilanolate, tetrapropylammonium tripropylsilanolate, and the like;
(VIII) phosphazene bases. Numerous phosphazene bases and routes for their synthesis have been described in the literature; and
(IX) Transient silanolate catalysts such as ammonium trifluoropropylmethylsilanolate.

Typically, for such catalysts, except transient catalysts (IX), the activity of the catalyst is quenched by using a neutralizing agent which reacts with the catalyst to render it non-active after completion of the polymerisation reaction. Any suitable neutralising agent may be utilised. These may include for the sake of example mild acids e.g., mild Lewis acids effective for neutralizing the basic catalyst. Such neutralizing agents can be selected from, for example, phosphoric acid, tris(chloroethyl)phosphite silyl phosphate carbon dioxide, and suitable buffers such as NaH$_2$PO$_4$, or Na$_2$HPO$_4$. An alternative neutralising agent which may be utilised is the weak Lewis acid carbon dioxide which functions when used in conjunction with silanolate catalysts. For example, when the catalyst used is a sodium silanolate the neutralising agent will typically react with the sodium silanolate to form sodium bicarbonate salt end groups and other sodium salts. Other neutralizing agents such as silyl phosphonates and fumed silica may be utilised alone or in combination with the silanols. The selection of the neutralizing agents can allow improved stripping of the gum product by improving the heat stability of the gum.

In the case of the transient catalysts (IX), the polymerisation reactor is heated/cooled to a reaction temperature of from 40 to 60° C. in the inert atmosphere for the polymerisation reaction to take place and then subsequently instead of the introduction of a neutralising agent, the reaction mixture is quenched by heating the final product to a temperature of at least 80° C. after the completion of the polymerisation process to generate ammonia gas which is then removed from the polymer reactor under vacuum. This may have the advantage that the use of vacuum may help to strip out at least some residual organocyclosiloxanes and by-products of the polymerisation reaction using heat and vacuum in the conical screw dump extruder polymerisation reactor.

The starting ingredients for the polymerisation reaction herein will comprise greater than (>) 99.5% organocyclosiloxane oligomer(s) together with adequate levels of the silanolate catalyst and —OH species containing chain initiator/endblocker.

The silanol-terminated silicone polymer gums prepared by the process herein are generally linear or substantially linear by which we mean they contain less than 2.5 wt. % of branching, alternatively, less than 1.5 wt. % of branching, alternatively less than 0.5 wt. % of branching, alternatively less than 0.1 wt. % of branching. The silanol-terminated silicone polymer gums prepared by the process herein have a William's plasticity of at least 200 mm/100 in accordance with ASTM D-926-08.

Silicone polymer gums (otherwise referred to in the industry as organopolysiloxane polymer gums, silicone polymer gums, or siloxane gums) have very high viscosities (at least 1,000,000 mPa·s at 25° C., often many millions mPa·s at 25° C.). Because of the difficulty in measuring the viscosity of such highly viscous fluids silicone polymer gums, tend to be defined by way of their William's plasticity (the ability of a specimen to produce a compressive deformation under external forces and to retain deformation after removing the external force) as opposed to by viscosity. Typically, silicone polymer gums can have a William's plasticity value of up to about 400 mm/100 in the case of fluorosilicone polymer gums measured in accordance with ASTM D-926-08. Alternatively, said silanol-terminated silicone polymer gums prepared by the process herein have a William's plasticity of at least 225 mm/100 in accordance with ASTM D-926-08, alternatively 250 mm/100 in accordance with ASTM D-926-08. Such plasticity values ensure that the resulting polymer products can be extruded from the polymerisation reactor without leaving a trail of unextruded material in the conical screw dump extruder which has to be cleaned up between batches.

In the process herein there are provided the following steps
(i) transporting the one or more organocyclosiloxane oligomer(s) having from 3 to 5 siloxane units per molecule to a polymerisation reactor, which polymerisation reactor is heated to a pre-defined temperature of from 40 to 170° C. in an inert atmosphere;
(ii) simultaneously with or subsequent to step (i), introducing a suitable —OH species containing chain initiator/endblocker into the polymerisation reactor and mixing same with the organocyclosiloxane oligomers (s) while residual water is removed, if required;
(iii) introducing a catalyst, suitable for catalysing the ring opening polymerization, into the polymerisation reactor to form a reaction mixture with the resulting mixture of step (ii) and subsequently proceeding with ring opening polymerisation of the one or more organocyclosiloxane oligomer(s) to generate a silicone polymer gum reaction product;
(iv) quenching the silicone polymer gum reaction product resulting from step (iii) and optionally vacuum stripping the silicone polymer gum reaction product with a vacuum means in said polymerisation reactor;
(v) Cooling the silicone polymer gum reaction product resulting from step (iv) to form a final silicone polymer gum reaction product; and then undertaking either one of steps (vi) or (vii) or both steps (vi) and (vii);
(vi) Transporting final silicone polymer gum reaction product to a packaging means for packaging in a suitable storage container;
(vii) Transporting final silicone polymer gum reaction product to a compounding means for combining said silicone polymer gum reaction product with other ingredients.

Prior to use the chosen organocyclosiloxane oligomer(s) are either stored in suitable storage containers or are supplied direct from being manufactured. If the chosen organocyclosiloxane oligomer(s) are supplied to the storage containers stored direct from being manufactured for immediate use or in said storage containers for immediate use or if the chosen organocyclosiloxane oligomer(s) are supplied direct from being manufactured the optional removal of residual water is optional and probably unnecessary because there will be almost no water to remove. However, if the chosen organocyclosiloxane oligomer(s) are stored in suitable storage containers for several days or longer than the removal of residual water will be necessary. In step (i) of the process the chosen organocyclosiloxane oligomer starting materials are transported e.g., pumped from the storage containers or direct from manufacture into the polymerisation reactor. The polymerisation reactor is a conical screw dump extruder, such as described for compounding pre-prepared ingredients to make a base composition or a curable silicone-based composition in U.S. Pat. No. 7,556,419 and US2021113975 from Colmec SpA. The organocyclosiloxane oligomer(s) are introduced into the conical screw dump extruder, through an inlet into a mixing chamber. If one oligomer stream is being supplied to the polymerisation reactor it may be transferred direct. In cases where two or more organocyclosiloxane oligomer streams are being supplied these may be pre-mixed in a suitable mixer before entry into the polymerisation reactor if desired, such that the different organocyclosiloxane oligomers are thoroughly inter-mixed when introduced into the polymerisation reactor. When more than one organocyclosiloxane oligomer is being utilised the respective organocyclosiloxane oligomers may be introduced into the conical screw dump extruder either simultaneously or through any other suitable mixing regime such as having an organocyclosiloxane oligomer at the start of the process and introducing aliquots of a second organocyclosiloxane oligomer periodically during the silanol-terminated silicone polymer gum production process.

The organocyclosiloxane oligomers used herein are of a low viscosity when in a liquid form e.g., <100 mPa·s at 25° C. Conical screw dump extruders are not designed for mixing low viscosity organocyclosiloxane oligomers as the primary ingredient or indeed for use as polymerisation reactors. The conical screw dump extruders are designed to inter-mix pre-formed polymers and fillers into a base material or compound with other ingredients not for polymerisation using low viscosity organocyclosiloxane oligomer s as the initial ingredients.

As described above during step (i) of the process the polymerisation reactor is heated to a pre-defined temperature of from 40 to 170° C. in an inert atmosphere. The initial elevated temperature selected is chosen with the intention of removing excess water by evaporation in step (ii) after addition of the suitable —OH species containing chain initiator/endblocker. However excess water can additionally or alternatively be extracted by means of inline molecular sieve traps that can be installed in piping to remove water as the ingredients are pumped through them. When relying on evaporation to remove excess water in step (ii) the pre-defined temperature selected in step (i) is typically from 100 to 170° C. The inert atmosphere may be any suitable inert atmosphere but is typically a nitrogen atmosphere. The introduction of a suitable —OH species which functions as a chain initiator/endblocker into the polymerisation reactor in step (ii) of the process may take place before, simultaneously with or after step (i) and the resulting combination of organocyclosiloxane oligomer (s) and chain initiator/endblocker(s) are mixed and heated to a predetermined temperature of from 100° C. to 170° C. while residual water is removed, if required, as discussed above.

Once residual water has been removed, in step (iii), if required, a basic catalyst suitable for catalysing the ring opening polymerization is introduced into the polymerisation reactor thereby enabling ring-opening polymerisation to commence with polymerisation subsequently taking place to generate a silicone polymer gum. The pre-defined temperature selected in step (i) may be the preferred polymerisation reaction temperature for step (iii) after the catalyst has been introduced. Typically, in the case of catalyst types (I) to (VIII) the preferred polymerisation reaction temperature is between 100 to 170° C. inclusive. However, if the pre-defined temperature in step (i) is different from the preferred polymerisation reaction temperature for step (iii) the mixture resulting from step (ii) may be heated or cooled prior to addition of the catalyst.

In the case of the transient catalysts (IX), the reaction temperature required is from 40 to 60° C. in the inert atmosphere. When a transient catalyst is therefore chosen for use and water was driven off by heating in step (ii) the polymerisation reactor is cooled to a temperature of from 40 to 60° C. in the inert atmosphere for the polymerisation reaction prior to introduction of the catalyst and then subsequently instead of the introduction of a neutralising agent to quench the reaction in step (iv), the reaction mixture may be heated to at least 80° C. at the end of the polymerisation process to generate ammonia gas which is then removed from the polymer reactor under vacuum. This may have the advantage that the use of vacuum may help to strip out at least some residual organocyclosiloxanes and by-products of the polymerisation reaction using heat and vacuum in the conical screw dump extruder polymerisation reactor.

As previously indicated the polymerisation reactor is a conical screw dump extruder comprising a conical twin screw chamber which houses two counter-rotating conical screws converging towards an extrusion die. In use the starting ingredients for the polymerisation reaction and products in the polymerisation reactor are driven towards the extrusion die by the counter-rotating screws. However, when the occlusion means is shut said starting ingredients and or polymerisation products are forced to move back up the conical twin screw chamber for further recirculation/additional mixing to enhance the homogeneity of the polymerisation product during polymerisation. The two counter-rotating screws are in converging and intersecting conical channels, wherein the peripheral profile of the screw threads runs adjacent to the channel surface. The material is thus forced to follow the conical profile of the screw to a progressively narrower volume, increasing the pressure as the reactants and polymerisation product approach the closed extrusion die during the silanol-terminated silicone polymer gum production process.

This increase in pressure enables the recirculation of the contents of the reaction chamber. If desired, e.g., perhaps when the polymer has reached a very high viscosity like a stiff gum the rotation of the two screws may be also temporarily reversed to assist in the polymerisation and/or mixing processes. Polytetrafluoroethylene (PTFE) packing may be utilised. However, in one embodiment if desired said screws may comprise lip seals on the shafts of said screws.

The extrusion die has an entrance and an exit wherein passage through the extrusion die from the entrance in the polymerisation reactor and to the exit is controlled by the aforementioned occlusion means. The occlusion means is maintained in the closed position during the silanol-terminated silicone polymer gum production process (e.g. steps (i) to (v) above) barring the exit of any contents present in the polymerisation reactor (conical screw dump extruder) such that the contents in the reactor, e.g. starting ingredients, polymers and any by-products, are driven towards the extrusion die by the pair of counter-rotating screws, and then forced to return back into the conical reaction chamber for further mixing repeatedly for a pre-defined polymerisation reaction period.

In step (iv) the reaction is quenched. This is, in most cases, achieved by introducing a suitable neutralising agent as hereinbefore described into the polymerisation reactor to neutralise the mixture resulting from the silanol-terminated silicone polymer gum production process, in particular the silicone polymer gum resulting from step (iii). In some instances, where desired, a vacuum may be applied inside the polymerisation reactor in order to vacuum strip the quenched product of steps (iii) and (iv) e.g., to remove any residual organocyclosiloxane oligomer(s) and/or impurities and/or by-products.

In step (v) of the process the resulting polymerisation product is cooled to a pre-defined temperature between 30° C. and 80° C., alternatively between 30° C. and 70° C. and then once cooled the occlusion means is moved to the open position to allow the resulting silicone polymer gum product to be extruded through the extrusion die.

In step (vi) the silicone polymer gum product issuing out of the polymerisation reactor through the extrusion die is collected and transferred to a suitable packaging means or if of an acceptable viscosity may be pumped to the packaging means. In step (vii) the silicone polymer gum product issuing out of the polymerisation reactor through the extrusion die is transported to a compounding means for further processing i.e. combining with additional ingredients to make, for example, a gel product, a rubber base or curable rubber compound or the like by being compounded together with other ingredients to e.g. make a silicone rubber base after mixing with a suitable reinforcing filler or a suitable curable silicone rubber composition, with said filler, cross-linker if required and a catalyst or curing agent. The compounding means may be any suitable compounder type mixer for example a sigma blade kneader mixer, a bottom discharge kneader mixer, a conical twin mixer e.g., screw dump extruder, a planetary extruder, a co-kneader extruder, a twin-screw extruder, a single screw extruder and/or a two-roll mill but may in this instance in one preferred embodiment be a second conical screw dump extruder. In such a case the silanol-terminated silicone polymer gum product may, if desired, first undergo a reaction to replace the silanol end groups with alternative end groups e.g., unsaturated end groups, such as alkenyl end groups or alkynyl end groups, typically alkenyl end groups such as a vinyl end groups. Alternatively the polymer gum may be end-capped with trialkyl end groups. When end-capping takes place, it is done by maintaining the newly polymerized silanol gum at a temperature of from 20 to 70° C. and then adding a small molecule such as a silane or disilazane such as divinyltetramethyldisilazane or hexamethyldisilazane and the like with continuous mixing. The silazane will then react with the —OH end groups on the reaction product to "cap" it. The temperature may then be increased to between 100° C. and 190° C. to remove any residual by-product such as ammonia. Optionally vacuum may also be applied if desired or additionally required. As discussed above, previously batch processes for making silicone polymer gums utilising the above ring-opening polymerisation processes often used a Kneader-style mixer for the preparation of the silicone polymer gums (high viscosity silicone polymers which have a viscosity of greater than 1,000,000 mPa·s at 25° C.) and then transferred/dumped the resulting polymer into a second piece of equipment such as a pan or large hopper extruder for down-packaging. One advantage of utilising a conical screw dump extruder as the polymerisation reactor as described herein is that it negates many of the previous problems as there is no requirement for transferring polymer materials between equipment. Using a conical screw dump extruder allows for the mixing and dispatch to a packaging means from the same piece of equipment and consequently contamination and reliability issues may be avoided.

Furthermore, utilising a conical screw dump extruder as the polymerisation reactor in this process avoids the previously laborious cleaning steps between batches because of the avoidance of the need for dumping and scraping residual materials between batches due to changeover loss and avoids the need to transfer polymers between equipment which protects operators from exposure to any potentially toxic materials. This is because the conical screw dump extruder is effectively self-cleaning. The conical shape of the screws, combined with the shape of the inner surface of the mixing body, allows the batch to be completely unloaded.

DESCRIPTION OF THE FIGURE

The disclosure herein is further explained below with reference to the drawing in which.

Figure 1:
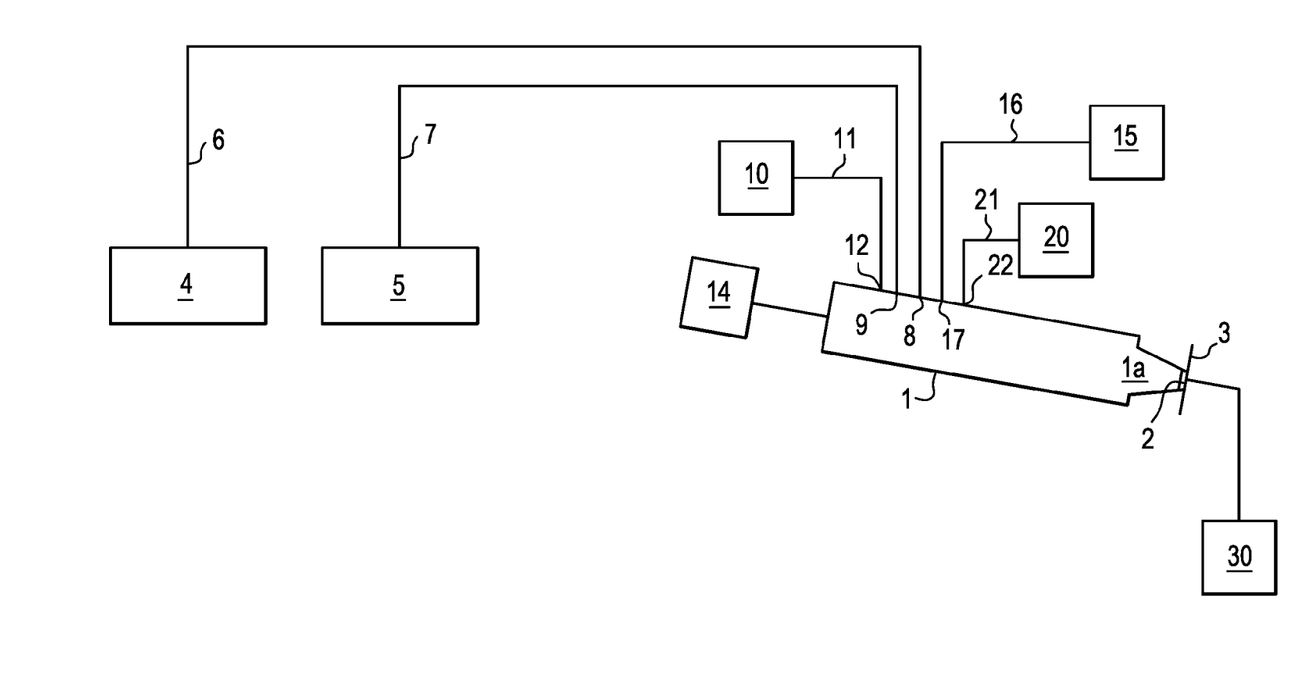
FIG. 1 shows a schematic depiction of an example of the silanol-terminated silicone polymer gum production process as described herein.

In FIG. 1 there is provided a conical screw dump extruder (1) which is utilised as a polymerisation reactor for the ring opening polymerisation of organocyclosiloxane oligomers. Conical screw dump extruder (1) has a conical twin screw chamber (1a) housing two intermeshing conical screws (not shown) which converge to an extrusion die (2). There is also provided an occlusion means (3) in the form of a plate which can be moved between an open and a closed position such that in the closed position occlusion means (3) is designed to prevent egress of polymer product during the silanol-terminated silicone polymer gum production process and in the open position (not shown) allowing said polymer product to egress through extrusion die. The two intermeshing conical screws operate in a counter-rotative manner and are driven by motor (14) of conical screw dump extruder (1). The intermeshing conical screws may, if desired, comprise lip seals on the shafts.

FIG. 1 also depicts two organocyclosiloxane oligomer storage tanks (4) and (5) and respective delivery lines (6) and (7) for transfer of the respective organocyclosiloxane oligomer through entry ports (8) and (9) into conical screw dump extruder (1). In the shown embodiment there two entry ports (8) and (9) are provided for introducing organocyclosiloxane oligomer into conical screw dump extruder (1). If desired these may be replaced by use of an organocyclosiloxane oligomer hopper (not shown) replacing entry ports (8) and (9) for the supply of organocyclosiloxane oligomer into conical screw dump extruder (1). Alternatively, or additionally delivery lines may be directed to a mixing means, e.g., a static mixer for mixing organocyclosiloxane oligomers together prior to entry into conical screw dump extruder (1) if desired.

There is also provided a neutralising agent supply tank (10), a neutralising agent delivery line (11) and a neutralising agent entry port (12). There is also provided a catalyst supply tank (15), a catalyst delivery line (16) and a catalyst entry port (17). There is also provided a chain initiator/endblocker supply tank (20), a chain initiator/endblocker delivery line (21) and a chain initiator/endblocker entry port (22).

Once silicone polymer gum prepared in the conical screw dump extruder (1) has issued through the extrusion die (2) it can be transported to a packaging means (30), in this instance, for packaging and storage.

In use, any number of different organocyclosiloxane oligomer(s) may be utilised but typically there will be 1 organocyclosiloxane oligomers or a mixture of 2, 3, 4 or 5 different organocyclosiloxane oligomers utilised, more often 1, 2 or 3 organocyclosiloxane oligomer(s) and usually 1 or 2 organocyclosiloxane oligomer(s). For the sake of this Figure, there are two selected organocyclosiloxane oligomer(s) and they are supplied from organocyclosiloxane oligomer storage tanks (4) and (5) into conical screw dump extruder (1) via respective delivery lines (6) and (7) and through respective entry ports (8) and (9). For example when a fluorosilicone polymer/copolymer gum is being prepared the organocyclosiloxane oligomer(s) supplied to the conical screw dump extruder (1) may be (3,3,3-trifluoropropyl)methylcyclotrisiloxane: $((CH_3)(CH_2CH_2CF_3)SiO)_3$ alone or in combination with one or more other organocyclosiloxane oligomer(s) such as octamethylcyclotetrasiloxane, hexamethylcyclotrisiloxane, tri-(methylvinyl)cyclotrisiloxane, tri-(ethylvinyl)cyclotrisiloxane, tetra-(methylvinyl)cyclotetrasiloxane or tetra-(ethylvinyl)cyclotetrasiloxane. For the sake of example, we shall hereafter describe the process on the basis of the organocyclosiloxane oligomers present being tri-(fluoropropylmethyl) tricyclosiloxane and optionally tri-(methylvinyl)cyclotrisiloxane. Hence for the benefit of this description (3,3,3-trifluoropropyl)methylcyclotrisiloxane is supplied to conical screw dump extruder (1) from organocyclosiloxane oligomer storage tank (4) and tri-(methylvinyl)cyclotrisiloxane is supplied to conical screw dump extruder (1) from organocyclosiloxane oligomer storage tank (5) if/when desired. They may be supplied in any order, simultaneously, or indeed may be supplied pre-mixed if desired. The starting ingredients for the polymerisation are maintained in an inert atmosphere, typically in a nitrogen atmosphere. Typically, the conical screw dump extruder (1) may be purged with nitrogen prior to the introduction of the organocyclosiloxane oligomers.

Simultaneously or subsequent to the introduction of the organocyclosiloxane oligomer(s) into the conical screw dump extruder (1), initiator/endblocker is supplied to conical screw dump extruder (1) from supply tank (20), via chain initiator/endblocker delivery line (21) and through said chain initiator/endblocker entry port (22) and is then mixed with the organocyclosiloxane oligomer(s), using the two intermeshing conical screws of the conical screw dump extruder (1). The occlusion means (3) is in the closed position. The resulting mixture is heated to a pre-defined temperature of between 4° and 170° C., usually between 10° and 170° C. allowing any excess water to be driven off. The initiator/endblocker may for the sake of example be any one of the initiators/endblockers described above but for the sake of this example is a silanol having the structure where the average value of d is from 4 to 8.

Once excess water has been driven off/evaporated and the mixture in conical screw dump extruder (1) has reached the pre-defined reaction temperature of from 40 to 170° C. dependent on the catalyst to be used for the polymerisation reaction, said catalyst is introduced into the conical screw dump extruder (1) from catalyst supply tank (15), via catalyst delivery line (16) through catalyst entry port (17). The catalyst may be any suitable catalyst mentioned above but in this case is preferably e.g., a suitable silanolate, e.g., an alkali metal silanolate, a non-metallic silanolate such as ammonium silanolate; or an alkali metal hydroxide. In the examples herein a suitable alkali metal silanolate is utilised as the catalyst.

The polymerisation ingredients are then continuously mixed using the two intermeshing conical screws of the conical screw dump extruder (1) with the occlusion means (3) in the closed position, for a predetermined period of time which is dependent on the polymer product desired.

During the silanol-terminated silicone polymer gum production process the contents of the conical screw dump extruder (1), i.e. the polymerisation ingredients and gradually, increasingly resulting polymer or gum is/are continuously mixed using the two counter-rotating intermeshing conical screws, such that during polymerisation the contents are driven towards extrusion die (2) by the pair of counter-rotating screws, and then forced to return back up conical twin screw chamber (1a) into the conical screw dump extruder (1). This continues throughout the time period when exit through the extrusion die (2) is prevented by the occlusion means (3) being in the closed position.

If desired, samples of the polymer generated via the ring-opening polymerisation process in the conical screw dump extruder (1), may be removed and analysed to check that the viscosity or in the case of gums the William's plasticity is within a predefined acceptable range before it is despatched from said conical screw dump extruder (1), through said extrusion die (2) after the occlusion means (3) has been opened.

Once the polymerisation reaction has completed, i.e., by having undergone the reaction for a predefined specific length of time or has reached a predefined physical property value e.g., a predefined William's plasticity value the polymerisation reaction can be quenched e.g., by introducing a suitable neutralising agent, typically a mild Lewis acid, as described previously. The neutralising agent is transferred from neutralising agent supply tank (10) and through a neutralising agent delivery line (11) and into the conical screw dump extruder (1) via neutralising agent entry port (12). The neutralising agent may, for example, be carbon dioxide. Subsequently any residual starting ingredients and/or by-products generated during the silanol-terminated silicone polymer gum production process herein may be extracted by vacuum and/or may be vacuum stripped. After the optional vacuum extraction step or vacuum stripping step ae completed the resulting polymerisation product in the conical screw dump extruder (1) is cooled and subsequently the occlusion means (3) is moved to an open position enabling the silicone polymer gum product to be extruded out of the conical screw dump extruder (1) through extrusion die (2) and transferred to, in the case of this FIG. 1, the packaging means (30) for packaging/storage.

The silanol-terminated silicone polymer gums prepared by the process herein have a William's plasticity of at least 200 mm/100 in accordance with ASTM D-926-08. Alternatively, said silanol-terminated silicone polymer gums prepared by the process herein have a William's plasticity of at least 225 mm/100 in accordance with ASTM D-926-08, alternatively of at least 250 mm/100 in accordance with ASTM D-926-08.

The silanol-terminated silicone polymer gum production process described herein utilising a conical screw dump extruder (1) as the polymerisation reactor (rather than as a means of compounding as previously identified), provides several advantages over previous polymerisation reactors used previously. For example, using a conical screw dump extruder (1) enables mixing and transferring of the resulting polymer/gum to a packaging means from the same piece of equipment because the conical screw dump extruder (1) functions as both reactor and extruder as it is able to extrude a resulting silicone polymer gum product through the extrusion die (2) once the occlusion means (3) is in the open position enabling polymer to be transported directly to a packaging means (30), in this instance. This utilisation of a single piece of equipment gives the additional advantage that its use results in a reduced risk of contamination and reliability problems.

Furthermore, typically conical screw dump extruders (1), such as those commercially available from Colmec SpA of Busto Arsizio, Italy, have a clamshell style opening design which enables easy cleanout, during use as a polymerisation reactor if required. It has also been determined that very little or no dumping and scraping is required between preparations of polymer batches due to the small loss of the overall batch weight remaining in the mixer following extrusion (heel). This also has the advantage of reducing the labour intensity of the process and further limits the exposure risk of operators to ingredients and by-products involved in the polymerisation process described herein. Additionally, the conical screw dump extruders, may have an integrated vacuum system capability which may enable stripping of the silicone polymer product to reduce levels of residual starting materials and/or by-products.

EXAMPLES

There follows a series of examples provided to show the suitability of the process for making silanol-terminated silicone polymer gum has a William's plasticity of at least 200 mm/100 in accordance with ASTM D-926-08. All gums prepared and/or used in the following examples contain at least one silanol terminal group. All plasticity targets and actual measurements given in the following tables are William's plasticity values in accordance with ASTM D-926-08. Reaction times provided are describing the length of time utilised in the examples for making the gums from the starting materials. The batch size is the approximate volume of the starting ingredients in the conical screw dump extruder utilised for the examples. In the Tables TFP is intended to mean trifluoropropyl.

In Ex. 1-1 a silanol-terminated silicone polymer gum was prepared in accordance with the silanol-terminated silicone polymer gum production process using a Colmec™ CTM-65 mixer as the conical screw dump extruder (1) The organocyclosiloxane oligomer s used were a trifluoropropyl methyl siloxane trimer and a small amount of vinylmethylsiloxane trimer. The —OH species containing chain initiator/endblocker was a silanol of the structure HO(MeTFPSi-O)$_d$—H where the average value of d was between 4 to 8, and the catalyst was a silanolate. Each ingredient was introduced into the conical screw dump extruder as described herein. The final volume of the starting ingredients was approximately 5 litres with greater than (>) 99.5% of the mixture being the one or more organocyclosiloxane oligomer(s) together with adequate levels of the silanolate catalyst. The ring opening polymerisation step took place for a period of about 60 minutes at a temperature of about 130° C. before the reaction/catalyst was quenched using solid carbon dioxide.

Until the neutralising agent was added the occlusion means (3) in the conical screw dump extruder (1) was maintained in the closed position. Subsequently, the occlusion means (3) was opened allowing the resulting the prepared silanol-terminated silicone polymer gum to be extruded through extrusion die (2) and was then transport to packaging. It was found that the resulting silanol-terminated silicone polymer gum made in the conical screw dump extruder (1) having a William's plasticity of greater than 200 mm/100 mixed well and extruded cleanly through extrusion die (2) with about 0.1 wt. % of the overall batch weight remaining in the mixer following extrusion (sometimes referred to as a 0.1 wt. % heel).

In the case of example Ex. 1.2 a pre-prepared fluorosilicone polymer gum was inserted into the conical screw dump extruder (1) was mixed for a short time with the occlusion means (3) closed and then was extruded through extrusion die (2) once the occlusion means was opened to determine if the gum extruded well. It was found that the gum having a William's plasticity of greater than 200 mm/100 mixed well and extruded cleanly through extrusion die (2) with less than (<) 1.5 wt. % of the overall batch weight remaining in the mixer following extrusion.

In the case of Ex. 1-3 an analogous process to Ex. 1-1 was undertaken in order to generate a silanol-terminated silicone polymer gum having a lower William's plasticity value. The organocyclosiloxane oligomer used was solely a trifluoropropyl methyl siloxane trimer. It was found that the process worked and that the silanol-terminated silicone polymer gum both mixed well and extruded cleanly through extrusion die (2) with <1.5 wt. % of the overall batch weight remaining in the mixer following extrusion.

The results and details are summarized in Table 1a.

TABLE 1a

Details of silanol-terminated silicone polymer gums prepared and/or mixed in the Colmec ™ CTM-65 mixer

|  | Example 1-1 | Example 1-2 | Example 1-3 |
|---|---|---|---|
| Gum Type | TFP-Me Vinyl (0.30%) siloxane gum | 100% TFP-Me siloxane gum | 100% TFP-Me siloxane gum |
| Reaction Time | 60 mins | N/A | 60 mins |
| Batch Size (L) | 5 | 5 | 5 |
| Plasticity Target (4.5 mL 3 mins) | 342.9 mm/100 | 292.1 mm/100 | 254 mm/100 |
| Plasticity Actual | 355.6 mm/100 | 292.1 mm/100 | 254 mm/100 |

The actual plasticity of the gum products was able to be finely tuned by controlling chain initiator/endblocker level and/or catalyst level.

Two comparative examples were then assessed. Comparative 1 was both prepared and tested for extrudability and mixing in the Colmec™ CTM-65 mixer, whilst comparative 2 was another pre-prepared gum having a much lower William's plasticity result compared to examples 1-1 to 1-3 discussed above. This was achieved by introducing higher loads of endblocker into the mixer. In the case of comparative 1 a gum was prepared using the Colmec™ CTM-65 mixer. In this instance a plasticity of under 200 mm/100 was deliberately polymerized in a similar manner to example 1-1. However, in this case the resulting gum had a much lower plasticity target and actual reading. It was found that the resulting gum was not suitable for being made in the Colmec™ CTM-65 mixer because the resulting gum was very sticky within the conical twin screw chamber (1a) and it was found that only 42 wt. % of the silanol-terminated silicone polymer gum extruded from the Colmec™ CTM-65 mixer, leaving 58 wt. % in the extruder which resulted in the fact that a laborious cleaning regime was required before the next batch could be prepared. This was considered unsatisfactory and therefore it was deemed materials of this William's plasticity could not be polymerised satisfactorily on the Colmec™ CTM-65 mixer, because it would not satisfactorily extrude, necessitating a significant and time-consuming cleaning regime between batches.

Comparative 2 was a second pre-prepared resulting silanol-terminated silicone polymer gum. In this instance it had been prepared from a dimethylsiloxane trimer as the starting organocyclosiloxane oligomer. The pre-prepared gum was inserted into the conical screw dump extruder (1) was mixed for a short time with the occlusion means (3) closed and then was extruded through extrusion die (2) once the occlusion means (3) had been opened to determine if the gum extruded well. It was found that the gum having a William's plasticity of lower than 200 mm/100 mixed OK but only about 65 wt. % of the gum was successfully extruded through the extrusion die (2) leaving 35 wt. % in the extruder which resulted in the fact that a laborious cleaning regime was required before the next batch could be prepared. This was considered unsatisfactory and therefore it was deemed materials of this William's plasticity could not be polymerised satisfactorily on the Colmec™ CTM-65 mixer, because it would not satisfactorily extrude, necessitating a significant and time-consuming cleaning regime between batches.

These results were summarized in Table 1.b below.

TABLE 1b

|  | Comparative 1 | Comparative 2 |
|---|---|---|
| Gum Type | 100% TFP-Me siloxane gum | 100% dimethyl siloxane gum |
| Reaction Time | 60 mins | N/A |
| Batch Size (L) | 5 | 5 |
| Plasticity Target (4.5 mL 3 mins) | 190.5 mm/100 | 177.8 mm/100 |
| Plasticity Actual | 190.0 mm/100 | 181.9 mm/100 |

What is claimed is:

1. A silanol-terminated silicone polymer gum production process, wherein the silanol-terminated silicone polymer gum has a William's plasticity of at least 200 mm/100 in accordance with ASTM D-926-08;

the silanol-terminated silicone polymer gum production process comprising:

undertaking a ring opening polymerization of one or more organocyclosiloxane oligomer(s) having from 3 to 5 siloxane units per molecule, which siloxane units comprise dialkylsiloxane units, alkylalkenylsiloxane units, trifluoroalkyl alkylsiloxane units, perfluoroalkyl alkyl siloxane units, phenylalkyl alkylsiloxane units or mixtures thereof in the organocyclosiloxane ring, wherein each alkyl group is the same or different and contains from 1 to 10 carbons, each alkenyl group is the same or different and has from 2 to 10 carbons; by (i) transporting the one or more organocyclosiloxane oligomer(s) having from 3 to 5 siloxane units per molecule to a polymerisation reactor, which polymerisation reactor is heated to a pre-defined temperature of from 40 to 170° C. in an inert atmosphere;

(ii) simultaneously with or subsequent to step (i), introducing a suitable —OH species containing chain initiator/endblocker into the polymerisation reactor and mixing same with the organocyclosiloxane oligomer(s) while residual water is removed, if required;

(iii) introducing a catalyst, suitable for catalysing the ring opening polymerization, into the polymerisation reactor to form a reaction mixture with the resulting mixture of step (ii) and subsequently proceeding with ring opening polymerisation of the at least one organocyclosiloxane oligomer(s) to generate a silicone polymer gum reaction product;

(iv) quenching the silicone polymer gum reaction product resulting from step (iii) and optionally vacuum stripping the silicone polymer gum reaction product with a vacuum means in the polymerisation reactor;

(v) cooling the silicone polymer gum reaction product resulting from step (iv) to form a final silicone polymer gum reaction product; and then undertaking either one of steps (vi) or (vii) or both of steps (vi) and (vii);

(vi) transporting the final silicone polymer gum reaction product to a packaging means (30) for packaging in a suitable storage container;

(vii) transporting the final silicone polymer gum reaction product to a compounding means for combining the silicone polymer gum reaction product with other ingredients;

wherein the polymerisation reactor utilised is a conical screw dump extruder (1) comprising a conical twin screw chamber (1*a*), the conical twin screw chamber (1*a*) housing two counter-rotating conical screws converging towards an extrusion die (2) having an entrance and an exit wherein passage through the extrusion die (2) is controlled by an occlusion means (3) such that the exit of the extrusion die (2) is adapted to be closed by the occlusion means (3) up to the end of step (v) and be open during steps (vi), step (vii) or both of steps (vi) and (vii) such that during polymerisation the reaction mixture is driven towards extrusion die (2) by the pair of counter-rotating conical screws, and then forced to go back into the conical twin screw chamber (1*a*) when the extrusion die (2) is closed by the occlusion means (3) and then during steps (vi), step (vii) or both of steps (vi) and (vii) is extruded through the extrusion die (2) and transported to the packaging means (30) and/or compounding means respectively.

2. The silanol-terminated silicone polymer gum production process in accordance with claim 1, wherein each organocyclosiloxane oligomer(s) having from 3 to 5 siloxane units per molecule, is a cyclic trimer.

3. The silanol-terminated silicone polymer gum production process in accordance with claim 1, wherein the organocyclosiloxane oligomer(s) comprise alkylvinyl siloxane units and/or trifluoropropyl methyl siloxane units.

4. The silanol-terminated silicone polymer gum production process in accordance with claim 1, wherein the organocyclosiloxane oligomer(s) comprise octamethylcyclotetrasiloxane, hexamethylcyclotrisiloxane, decamethylcyclopentasiloxane, penta-(methylvinyl)cyclopentasiloxane, tetra-(phenylmethyl) cyclotetrasiloxane, penta-(methylhydro)cyclopentasiloxane, tri-(methylvinyl) cyclotrisiloxane, tri-(ethylvinyl)cyclotrisiloxane, tetra-(methylvinyl)cyclotetrasiloxane, tetra-(ethylvinyl)cyclotetrasiloxane, penta-(methylvinyl)cyclopentasiloxane, penta-(ethylvinyl)cyclopentasiloxane, tri-(fluoropropylmethyl) tricyclosiloxane, tri-(fluoropropylethyl) tricyclosiloxane, tetra-(fluoropropylmethyl) tetracyclosiloxane, tetra-(fluoropropylethyl) tetracyclosiloxane, penta-(fluoropropylmethyl) pentacyclosiloxane, penta-(fluoropropylethyl) pentacyclosiloxane, tri-(fluoroethylmethyl) tricyclosiloxane, tri-(fluoroethylethyl) tricyclosiloxane, tetra-(fluoroethylmethyl) tetracyclosiloxane, tetra-(fluoroethylethyl) tetracyclosiloxane, penta-(fluoroethylmethyl) pentacyclosiloxane, penta-(fluoroethylethyl) pentacyclosiloxane and mixtures thereof.

5. The silanol-terminated silicone polymer gum production process in accordance with claim 1, wherein the catalyst is a silanolate catalyst.

6. The silanol-terminated silicone polymer gum production process in accordance with claim 1, wherein the catalyst is an alkali metal containing silanolate catalyst.

7. The silanol-terminated silicone polymer gum production process in accordance with claim 1, wherein the quenching of step (iv) is undertaken by introducing a neutralizing agent.

8. The silanol-terminated silicone polymer gum production process in accordance with claim 7, wherein the neutralising agent comprises phosphoric acid, tris(chloroethyl) phosphite silyl phosphate, carbon dioxide, $NaH_2PO_4$, $Na_2HPO_4$, silyl phosphonates and/or fumed silica.

9. The silanol-terminated silicone polymer gum production process in accordance with claim 1, wherein the catalyst is a transient silanolate catalyst.

10. The silanol-terminated silicone polymer gum production process in accordance with claim 1, wherein in step (i) the chosen organocyclosiloxane oligomer(s) are either transported from suitable storage tanks (4, 5) or are supplied direct from being manufactured.

11. The silanol-terminated silicone polymer gum production process in accordance with claim 1, wherein the compounding means of step (vii) is a second conical screw dump extruder.

* * * * *